United States Patent [19]

Sheldon

[11] Patent Number: 6,162,471
[45] Date of Patent: Dec. 19, 2000

[54] THICKENED HYDROLYTE ISOTONIC BEVERAGE

[75] Inventor: Kathie L. Sheldon, Austin, Minn.

[73] Assignee: Hormel Foods Corporation, Austin, Minn.

[21] Appl. No.: 09/444,348

[22] Filed: Nov. 19, 1999

Related U.S. Application Data

[63] Continuation of application No. 09/042,271, Mar. 13, 1998, Pat. No. 6,033,713.

[51] Int. Cl.⁷ .............................. A23L 1/303; A23L 1/304; A23L 1/0522
[52] U.S. Cl. .................................. 426/2; 426/72; 426/74; 426/578; 426/590; 426/650; 424/455; 424/461; 424/479; 424/493
[58] Field of Search ................................... 426/2, 72, 74, 426/578, 590, 650; 424/455, 461, 479, 493

[56] References Cited

U.S. PATENT DOCUMENTS

| | | | |
|---|---|---|---|
| 4,479,973 | 10/1984 | Holley | 426/573 |
| 5,032,411 | 7/1991 | Stray-Gundersen | 426/74 |
| 6,033,713 | 3/2000 | Sheldon | 426/590 |

OTHER PUBLICATIONS

Flavors From Florida —Product Specification Sheet; 2 Pages; Apr. 23, 1997.

*Primary Examiner*—Helen Pratt
*Attorney, Agent, or Firm*—Mau & Krull, P.A.

[57] ABSTRACT

A prethickened hydrolytic beverage useful in rehydrating and regaining electrolytic balance with those suffering from dysphagia. Said beverage comprises water, a carbohydrate source, a modified food starch, various electrolytes and other minor ingredients.

12 Claims, No Drawings

THICKENED HYDROLYTE ISOTONIC BEVERAGE

This application is a continuation of Ser. No. 09/042,271 filed Mar. 13, 1998 now U.S. Pat. No. 6,033,713.

FIELD OF THE INVENTION

The invention relates to electrolytic beverages useful in restoring lost water and regaining electrolytic balance and further relates to prethickened electrolytic beverages useful in restoring lost water and regaining electrolytic balance for those suffering from dysphagia.

BACKGROUND OF THE INVENTION

Several beverages currently exist which aid in replacing fluids lost to exertion or illness. For example, GATORADE® is a well known beverage which serves to replace fluids and necessary minerals in athletes. PEDIALYTE® is a well known beverage which serves essentially the same purpose for infants and small children.

None of the isotonic beverages currently on the market address the problem of dysphagia, which is a difficulty in swallowing. Although dysphagia can have many different possible medical causes, a difficulty in swallowing is common to them all. People who have this difficulty also have a need for replenishing fluids and electrolytes. It has been found that people with this affliction can more easily swallow liquids which have been thickened. Unfortunately, no prethickened isotonic beverage is currently available. Consequently, a need still exists for such a prethickened, isotonic beverage.

SUMMARY OF THE INVENTION

We have found a novel composition for a prethickened, isotonic beverage which is useful for those suffering from dysphagia. The beverage of the invention is useful in restoring lost water and regaining electrolyte balance. Said beverage comprises water, a carbohydrate source, a modified food starch and contains small amounts of citric acid, salt, sodium citrate, natural and artificial flavors, potassium citrate, tricalcium phosphate, glycerol ester of wood resin, sodium benzoate, potassium sorbate, TBHQ Tertiary-Butyl Hydroxy Quinone (preservatives), brominated soybean oil and ascorbic acid.

DETAILED DESCRIPTION OF THE INVENTION

The beverage of the invention comprises water, a carbohydrate source, a modified food starch and contains small amounts of citric acid, salt, sodium citrate, natural and artificial flavors, potassium citrate, tricalcium phosphate, glycerol ester of wood resin, sodium benzoate, potassium sorbate, TBHQ (preservatives), brominated soybean oil and ascorbic acid. Since the presently claimed invention contains a number of different ingredients, it is important to understand the part played by each ingredient. Each of the important ingredients are explained herein.

Water

Water is the most important ingredient in the thickened hydrolyte. Obviously, water serves to help replace lost fluids within the body. In addition, water serves as a carrier for the carbohydrates and minerals necessary to aid the effectiveness of the beverage. Finally, water aids in regulating one's internal body temperature.

Water is present in the claimed invention at a total concentration of 80–90 weight percent.

Carbohydrates

Carbohydrates are present in the beverage of the invention as an energy source. Sugars such as sucrose and glucose may be used as the carbohydrate in the claimed invention. In a preferred embodiment, high fructose corn syrup solids with a dextrose equivalent (DE) value of 42 are used as the carbohydrate in the invention.

It should be noted that the high fructose corn syrup solids as used in the preferred embodiment are present at a particular concentration in the thickened electrolytic beverage. While carbohydrates are necessary and beneficial as an energy source, absorption in the small intestine is slowed if the carbohydrate concentration is too high. Preferably the carbohydrate source is present at a total concentration of 9.6 to 10.2 weight percent. Consequently, this is the approximate concentration of carbohydrate present in the presently claimed beverage.

Electrolytes

Several electrolytes are present in the thickened hydrolyte beverage to help replenish the minerals lost through sweat. These include sodium chloride, sodium citrate, potassium citrate, tricalcium phosphate, potassium sorbate and potassium phosphate. It should be noted that the sodium content helps stimulate people to drink more fluid voluntarily. This gives an advantage over water since voluntary consumption helps encourage a person to drink enough fluids to be adequately rehydrated. It is important to remember that thirst alone is a poor indicator of fluid needs. The human body becomes partially dehydrated even before any sense of thirst felt. Sodium also helps a person maintain body fluids whereas consuming plain water can actually trigger water loss by increasing urine production.

Total electrolyte concentration varies from 0.5 to 0.7 weight percent, on a dry basis.

Modified Food Starch

Modified food starch is present to provide the necessary viscosity, or thickness, to the claimed invention. The final product has an appropriate viscosity range which depends on the specific embodiment. For example, the nectar variety has a viscosity which ranges from 800 to 2300 centipoise (cP) as measured at 68 to 70° F. with a Brookfield Viscometer using spindle #4 and a motor speed of 20 rpm. The honey variety, however, has a viscosity which ranges from 2300 to 5400 cP using spindle #5 under the same conditions. The starch is present at a total concentration of 3.25 to 5.0 weight percent. Preferably the starch is a corn starch.

Other Ingredients

Citric acid is present for several reasons. First, it provides tartness to help balance the sweet taste resulting from the carbohydrates which may comprise high fructose corn syrup solids. It also helps give a clean mouth feel and also lowers the pH of the product, which aids in safe processing.

A variety of natural and artificial flavors are used in order to improve the flavor of the thickened hydrolyte beverage, and also help to encourage fluid intake.

Brominated soybean oil is present as a "cloudifier". This helps improve the appearance of the product.

Ascorbic acid is present as a source of Vitamin C. The daily requirement for Vitamin C is 60 mg/serving.

Preferred Embodiments

One possible embodiment of the invention is created by adding water to the dry ingredients listed below. These dry ingredients constitutes base #1.

Base #1

| Ingredient | Weight Percent |
| --- | --- |
| sucrose | 61.075 |
| high fructose corn syrup solids | 33.93 |
| potassium phosphate (monobasic) | 0.163 |
| Sodium Chloride | 0.543 |
| Sodium Citrate | 0.0814 |
| Ascorbic acid | 0.136 |
| citric acid | 4.072 |

Another possible embodiment involves base #2, which is a Lemon-Lime Isotonic Base supplied by "Flavors from Florida". This base consists of the following ingredients:

Base #2

| Ingredient | Weight Percent |
| --- | --- |
| water | |
| citric acid | |
| modified food starch | |
| salt (sodium chloride) | |
| sodium citrate | |
| natural and artificial flavors | |
| potassium citrate | |
| tricalcium phosphate | |
| glycerol ester of wood rosin | |
| sodium benzoate | |
| potassium sorbate | |
| brominated vegetable oil | |
| TBHQ | |
| ascorbic acid | |

Preferred embodiments are given for both nectar and honey varieties. The ingredients for each are given below:

| Ingredient | Weight Percent (nectar) | Weight Percent (honey) |
| --- | --- | --- |
| base (#1 or #2) | 0.96 | 0.95 |
| high fructose corn syrup solids (DE 42) | 7.14 | 7.00 |
| water | 88.30 | 86.96 |
| ascorbic acid | 0.09 | 0.09 |
| modified food starch | 3.51 | 5.00 |

Test Results

A 100 g sample of the claimed beverage was tested for content. These results are given below:

| Content | Quantity |
| --- | --- |
| protein | 0.01% |
| moisture | 89.68 to 90.3% |
| fat (wet) | 0.05% |
| phosphorous | 5.5 to 10.9 ppm |
| pH | 3.0 to 3.2 |
| calcium | 42 to 49.8 ppm |
| sodium | 217 to 273.95 ppm |
| potassium | 28.5 to 33.10 ppm |
| iron | 0.2 to 0.3 ppm |
| zinc | 0.33 to 0.36 ppm |
| total solids | 8.83 to 9.69% |
| ash | 0.05 to 0.06% |
| beta carotene (IU/100 g) | 0 |
| carbohydrate by difference | 9.6 to 10.2 |
| calories per ounce | 11 to 11.90 |
| calories per 100 g | 38.4 to 41.70 |
| magnesium | 8.5 to 11.0 ppm |
| copper | 0.10 ppm |
| chloride | 0.02 to 0.07% |
| titratable acidity | 0.24 to 0.25 |
| vitamin A (IU/100 g) | 0 |
| vitamin C (mg/100 g) | 72.70 to 75.4 |
| sugar profile, total | 4.84 to 5.44% |
| fructose | 2.92 to 3.12% |
| glucose | 1.92 to 2.32% |
| sucrose | 0 |
| maltose | 0 |

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A prethickened water-based isotonic beverage beneficial in rehydration and fluid absorption for people suffering from dysphagia, wherein said beverage consisting essentially of water, a carbohydrate source, a modified food starch sufficient for the beverage to have a viscosity of 800 or more centipose, an electrolyte source of at least 0.0060% of the beverage and flavors.

2. The beverage of claim 1 wherein the carbohydrate source comprises high fructose corn syrup solids.

3. The beverage of claim 1 wherein the carbohydrate source comprises sucrose.

4. The beverage of claim 1 wherein the carbohydrate source comprises glucose.

5. The beverage of claim 1 wherein the modified food starch comprises corn starch.

6. The modified food starch of claim 5 wherein the corn starch is present at a concentration ranging from 3.25 to 5.0 weight percent.

7. The beverage of claim 1 wherein the carbohydrate source is present at a total concentration of 9.6 to 10.2 weight percent.

8. The beverage of claim 1 wherein water is present at a total concentration of 80 to 90 weight percent.

9. The beverage of claim 1 wherein the electrolyte source comprises sodium chloride, sodium citrate, potassium citrate, tricalcium phosphate, potassium sorbate or potassium phosphate.

10. The beverage of claim 1 further comprising other minor ingredients which comprises citric acid, glycerol ester or wood rosin, sodium benzoate, potassium sorbate, a preservative, brominated soybean oil, ascorbic acid, natural and artificial flavors and artificial or natural color.

11. The beverage of claim 1 further comprising a source of Vitamin C wherein said source provides 100 percent of the daily requirement of 60 mg per serving.

12. The beverage of claim 1, wherein the flavors are natural flavors and artificial flavors.

* * * * *